(12) United States Patent
Alam et al.

(10) Patent No.: US 11,113,959 B2
(45) Date of Patent: Sep. 7, 2021

(54) CROWDSOURCED DETECTION, IDENTIFICATION AND SHARING OF HAZARDOUS ROAD OBJECTS IN HD MAPS

(71) Applicants: S M Iftekharul Alam, Hillsboro, OR (US); David I. Gonzalez Aguirre, Hillsboro, OR (US); Sridhar Sharma, Palo Alto, CA (US); Kathiravetpillai Sivanesan, Portland, OR (US); Ignacio Alvarez, Portland, OR (US)

(72) Inventors: S M Iftekharul Alam, Hillsboro, OR (US); David I. Gonzalez Aguirre, Hillsboro, OR (US); Sridhar Sharma, Palo Alto, CA (US); Kathiravetpillai Sivanesan, Portland, OR (US); Ignacio Alvarez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 246 days.

(21) Appl. No.: 16/235,694

(22) Filed: Dec. 28, 2018

(65) Prior Publication Data
US 2019/0139403 A1      May 9, 2019

(51) Int. Cl.
*G08G 1/01*      (2006.01)
*G01C 21/34*     (2006.01)
(Continued)

(52) U.S. Cl.
CPC ........... *G08G 1/0141* (2013.01); *G01C 21/32* (2013.01); *G01C 21/3461* (2013.01);
(Continued)

(58) Field of Classification Search
CPC .... G08G 1/0141; G08G 1/012; G08G 1/0133; G08G 1/0112; G01C 21/32;
(Continued)

(56) References Cited

U.S. PATENT DOCUMENTS

| | | | |
|---|---|---|---|
| 2009/0021423 A1 | 1/2009 | Cheng et al. | |
| 2011/0109618 A1* | 5/2011 | Nowak | G01C 21/3647 345/419 |

(Continued)

OTHER PUBLICATIONS

International Search Report and Written Opinion for International Patent Application No. PCT/US2019/063672, dated Mar. 24, 2020, 13 pages.

(Continued)

*Primary Examiner* — Mussa A Shaawat
(74) *Attorney, Agent, or Firm* — Jordan IP Law, LLC

(57) ABSTRACT

Systems, apparatuses and methods may provide for vehicle technology that detects one or more differences between a crowdsourced map of an ambient environment and a real-time volumetric map of the ambient environment and sends a first message via a vehicle-to-vehicle (V2V) link, wherein the difference(s) are represented in the first message at a first resolution. Additionally, the vehicle technology sends a second message via a vehicle-to-infrastructure (V2I) link, wherein the difference(s) are represented in the second message at a second resolution, and wherein the first resolution is less than the second resolution. Moreover, server technology may integrate a first octree representation and a second octree representation into a dynamic layer associated with the crowdsourced map.

24 Claims, 9 Drawing Sheets

(51) Int. Cl.
*G06F 16/29* (2019.01)
*G06T 17/00* (2006.01)
*H04W 4/40* (2018.01)
*G01C 21/32* (2006.01)
*H04W 4/06* (2009.01)
*H04W 4/02* (2018.01)
*H04W 4/46* (2018.01)

(52) U.S. Cl.
CPC ............ *G06F 16/29* (2019.01); *G06T 17/005* (2013.01); *G08G 1/012* (2013.01); *G08G 1/0112* (2013.01); *G08G 1/0133* (2013.01); *H04W 4/40* (2018.02); *H04W 4/02* (2013.01); *H04W 4/06* (2013.01); *H04W 4/46* (2018.02)

(58) Field of Classification Search
CPC ...... G01C 21/3461; H04W 4/06; H04W 4/02; H04W 4/46; H04W 4/40; G06F 16/29
See application file for complete search history.

(56) References Cited

U.S. PATENT DOCUMENTS

| | | | |
|---|---|---|---|
| 2015/0019076 A1 | 1/2015 | Stahlin et al. | |
| 2015/0138310 A1* | 5/2015 | Fan | G06K 9/00791 348/36 |
| 2016/0210525 A1 | 7/2016 | Yang et al. | |
| 2018/0053403 A1 | 2/2018 | Wieskamp et al. | |
| 2018/0259966 A1* | 9/2018 | Long | G05D 1/0246 |
| 2018/0300964 A1* | 10/2018 | Lakshamanan | G06N 3/063 |
| 2019/0050652 A1* | 2/2019 | Baker | B60W 40/09 |
| 2019/0114921 A1* | 4/2019 | Cazzoli | H04W 4/40 |
| 2019/0139403 A1 | 5/2019 | Alam et al. | |
| 2019/0228262 A1* | 7/2019 | Gonzalez | G06K 9/00791 |
| 2019/0384283 A1* | 12/2019 | Chowdhary | G06K 9/6263 |
| 2020/0031356 A1* | 1/2020 | Ozog | G05D 1/0274 |
| 2020/0059886 A1* | 2/2020 | Yu | H04L 5/0048 |
| 2020/0111169 A1* | 4/2020 | Halder | G01C 21/3691 |
| 2020/0133272 A1* | 4/2020 | Chong | G01C 21/3602 |
| 2020/0183389 A1* | 6/2020 | Kim | G06Q 50/30 |
| 2020/0294401 A1* | 9/2020 | Kerecsen | G05D 1/0287 |

OTHER PUBLICATIONS

Jessup et al., "Merging of octree based 3D occupancy grid maps," 2014 IEEE International System Conference Proceedings, Apr. 3, 2014, 7 pages.

Besl et al., "A Method for Registration of 3-D Shapes", IEEE Transactions on Pattern Analysis and Machine Intelligence, vol. 14, No. 2, Feb. 1992, pp. 239-256.

Eggert et al., "Octree-Based SIMD Strategy for ICP Registration and Alignment of 3D Point Clouds", ISPRS Annals of the Photogrammetry, Remote Sensing and Spatial Information Sciences, vol. I-3, 2012, pp. 105-110.

Hedgecock et al., "Accurate Real-Time Relative Localization Using Single-Frequency GPS", The ACM Conference on Embedded Networked Sensor Systems, Nov. 2014, 15 pages.

HERE Technologies, "HERE HD Live Map Technical Paper", 2017, 8 pages.

A. Hornung et al., "An Efficient Probabilistic 3D Mapping Framework Based on Octrees", Autonomous Robots, Apr. 2013, 17 pages.

H. Qiu et al., "AVR: Augmented Vehicular Reality", Proceedings of the 16th Annual International Conference on Mobile Systems, Applications, and Services, Jun. 2018, 15 pages.

International Preliminary Report on Patentability for International Application No. PCT/US2019/063672, dated Jul. 8, 2021, 9 pages.

* cited by examiner

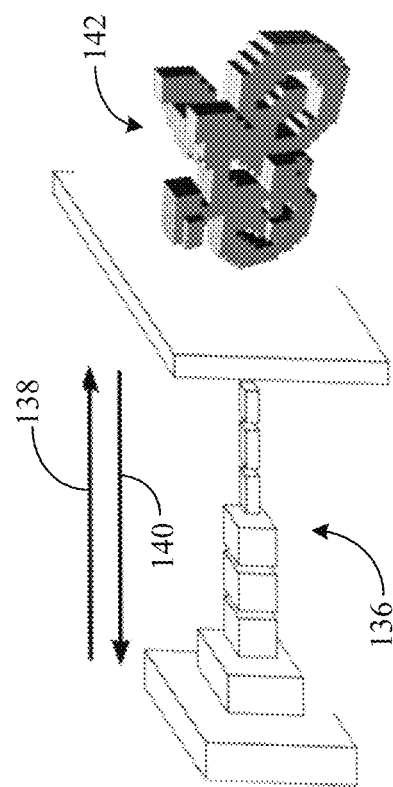
FIG. 8D
FIG. 8C
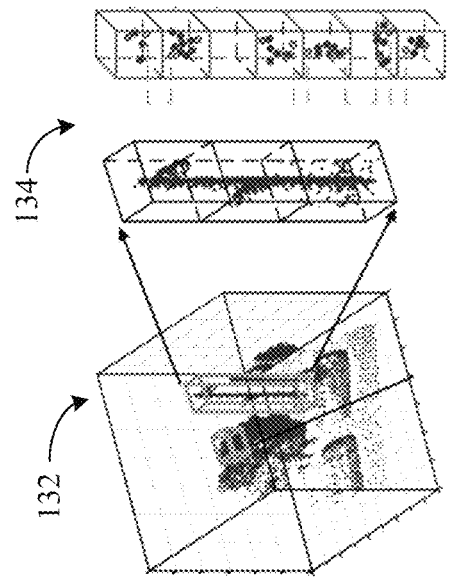
FIG. 8B
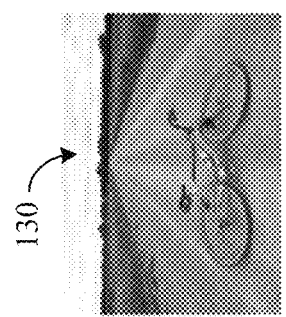
FIG. 8A

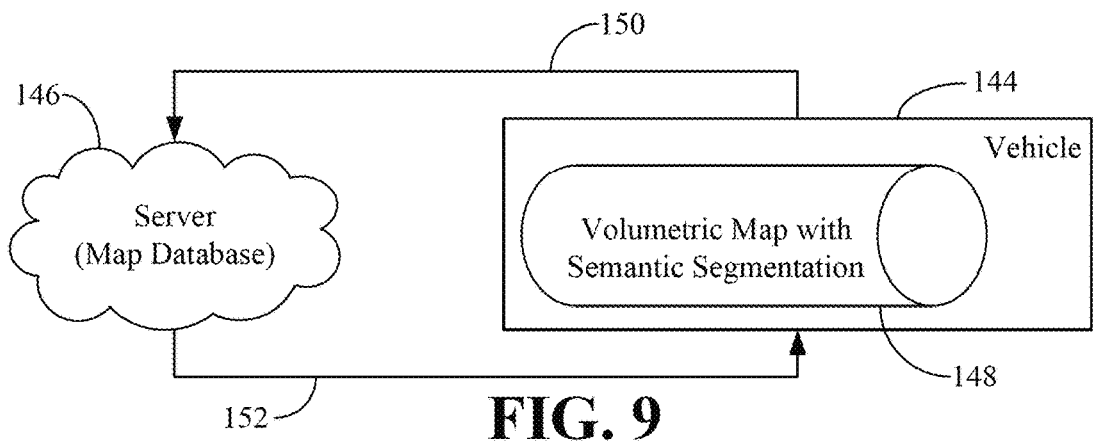
FIG. 9
FIG. 10A
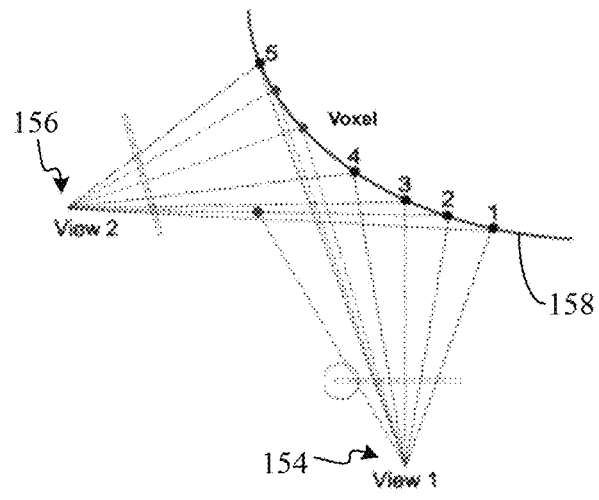
FIG. 10B
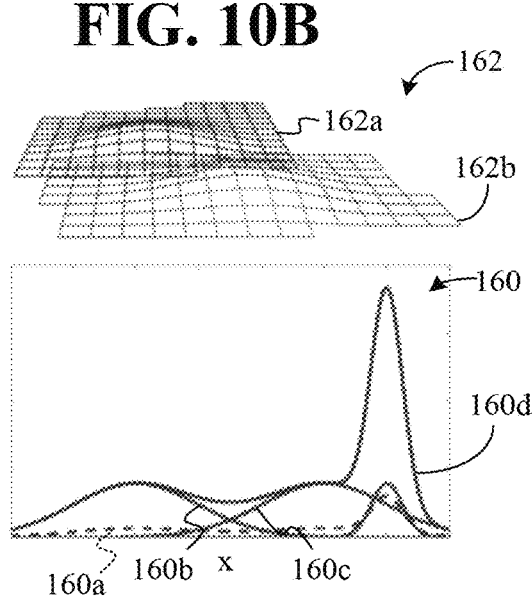
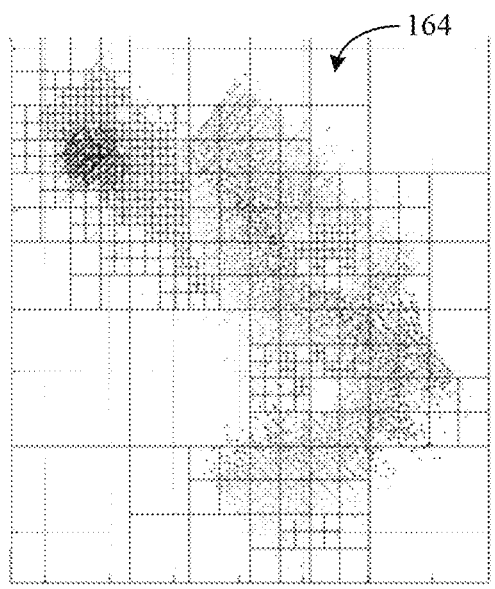
FIG. 10C
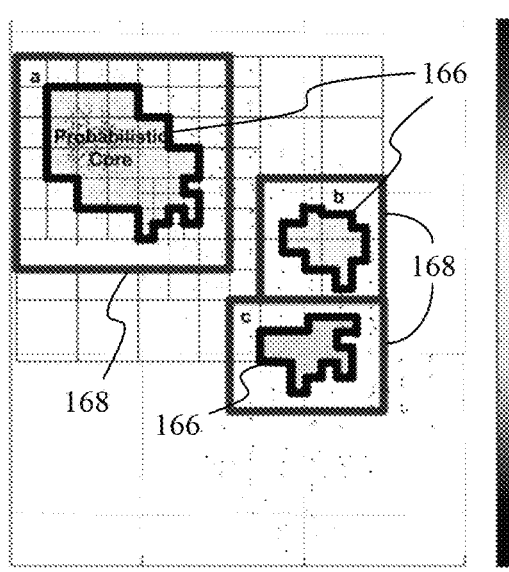
FIG. 10D

CROWDSOURCED DETECTION, IDENTIFICATION AND SHARING OF HAZARDOUS ROAD OBJECTS IN HD MAPS

TECHNICAL FIELD

Embodiments generally relate to object detection. More particularly, embodiments relate to crowdsourced detection, identification and sharing of hazardous road objects in high definition (HD) maps.

BACKGROUND

Autonomous vehicles may use HD maps to automatically determine road layouts, what obstructions may lie ahead, and so forth. For example, in a "self-healing" map scenario, each participating vehicle may compare locally-sensed data with a stored HD map to detect differential features, which may then be transmitted via a vehicle-to-infrastructure (V2I) link to a server for inclusion in an updated HD map. The server may transmit the updated HD map to the participating vehicles via the V2I link, wherein the communications between the vehicles and the server typically consume a considerable amount of network bandwidth. Indeed, network bandwidth may be wasted if the differential features correspond to small objects that pose no hazard to vehicles on the road.

BRIEF DESCRIPTION OF THE DRAWINGS

The various advantages of the embodiments will become apparent to one skilled in the art by reading the following specification and appended claims, and by referencing the following drawings, in which:

FIGS. 8A-8D are illustrations of examples of a voxel semantic segmentation according to an embodiment;

FIG. 9 is a block diagram of an example of an interaction between a vehicle and a server according to an embodiment;

FIGS. 10A-10D are illustrations of an example of a probabilistic fusion of multiple differences from multiple vehicles according to an embodiment;

DESCRIPTION OF EMBODIMENTS

Figure 1B:
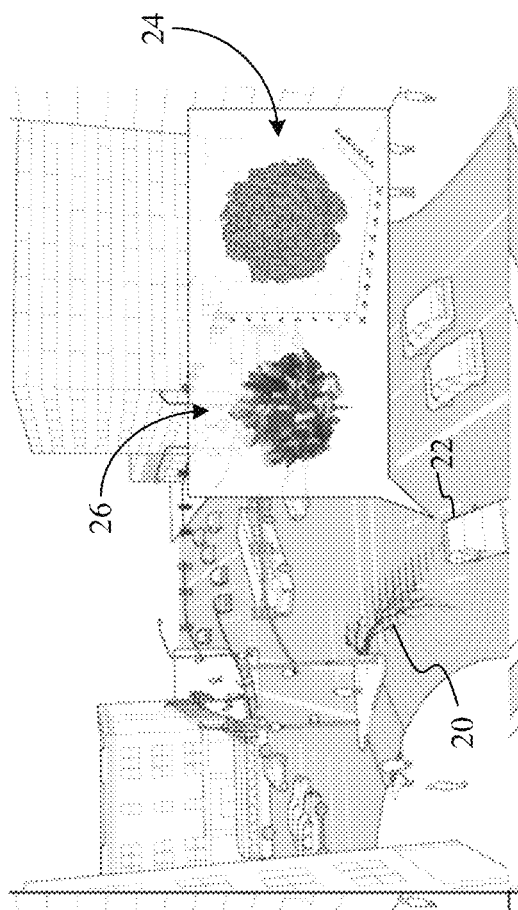
FIGS. 1A-1D are illustrations of an example of a spatial deviation management solution according to an embodiment.
Figure 1A:
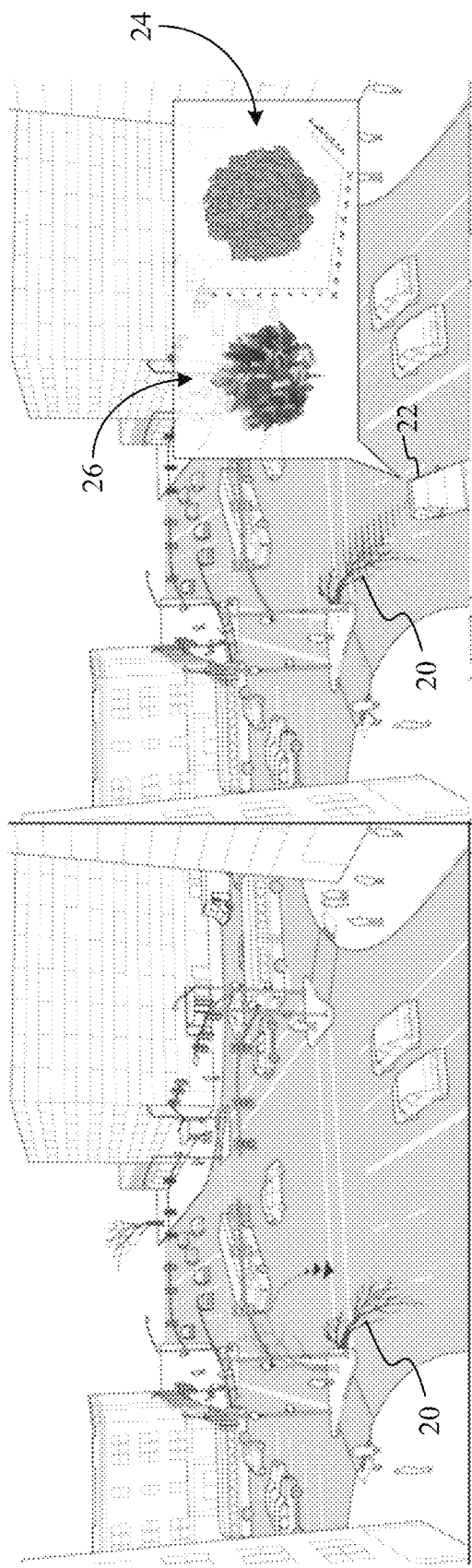

Turning now to FIGS. 1A-1D, perspective and plan views of a traffic environment (e.g., intersection) are shown in which a spatial obstruction 20 such as, for example, a tree, falls into the road. As best shown in FIG. 1B, a vehicle 22 (e.g., autonomous or manually operated car) in the vicinity of the spatial obstruction 20 may include ranging sensors (e.g., light detection and ranging (LiDAR or lidar), radio detection and ranging/radar, sound navigation and ranging/sonar), depth sensors (e.g., stereo vision) and/or appearance sensors (e.g., red, green, blue/RGB camera, multi-spectral infrared/IR camera) that detect/capture the spatial obstruction 20. In an embodiment, the vehicle 22 stores a crowdsourced map (e.g., a static HD map) of the traffic environment, wherein the stored map is obtained from a remote server, road side unit (RSU), base station, infrastructure node, and so forth. Because the spatial obstruction 20 is a new and/or unexpected change in the traffic environment, the spatial obstruction 20 is not visible/included in the stored map.

In the illustrated example, the vehicle 22 captures the spatial obstruction 20 as a high resolution volumetric deviation 24 (e.g., one or more differences characterized at, for example, 5-10 cm per volumetric pixel/voxel) from the stored map and as a low resolution volumetric deviation 26 (e.g., one or more differences characterized at, for example, 25-50 cm per voxel) from the stored map. FIG. 1C demonstrates that the low resolution volumetric deviation 26 may be sent wirelessly (e.g., broadcasted over a limited radius such as 0.5-1 km) via vehicle-to-vehicle (V2V) links to one or more nearby vehicles 28 (28a-28n, which may include autonomous vehicles).

As will be discussed in greater detail, the low resolution volumetric deviation 26 is represented in the messages to the nearby vehicles 28 as an octree 30 that enables the deviation 26 to be communicated quickly with minimal wireless bandwidth consumption. More particularly, while a voxelization (e.g., sparse three-dimensional/3D rasterization) of the spatial obstruction 20 takes place, the serialized and compressed low resolution volumetric deviation 26 is broadcasted as soon as the octree 30 is complete at the low resolution. At this phase, rich metadata (e.g., texture, points or other sensor signals) is not added to the octree 30. Rather, as soon as an object is detected, the size and shape of the hazard is communicated to other vehicles and low-resolution images without rich metadata like texture is sufficient. Accordingly, the communications are optimized for speed. Indeed, the octree 30 representation may be communicated in a single packet, with the payload size being less than the maximum transmission unit (MTU) of the underlying communication protocol. Accordingly, the illustrated nearby vehicles 28 are instantaneously alerted to the hazardous nature of the spatial obstruction 20 and may navigate around the spatial obstruction 20 more safely.

Moreover, the vehicle 22 may take into consideration the size of the spatial obstruction 20 when determining whether to notify the nearby vehicles 28 of the spatial obstruction 20. Thus, smaller objects may be disregarded as not posing a safety risk, whereas larger objects are reported via the low latency V2V links. Such an approach enables wireless bandwidth consumption to be further reduced.

The illustrated vehicle 22 also represents the high resolution volumetric deviation 24 as an octree 32 that is sent wirelessly to a cloud computing system 34 (e.g., server, RSU, base station, infrastructure node) via a vehicle-to-infrastructure (V2I) link for further processing and inclusion in an updated map. More particularly, the high resolution volumetric deviation 24 may contain not only finer voxels (e.g., around 5 cm), but also additional data such as point clouds generated by a LiDAR, registered images generated by a camera and other available sensor readings such as radar and/or ultrasound measurements. This additional information is included so that the cloud computing system 34 may integrate the multiple readings and modalities into a more reliable and precise model for both human and machine consumption.

Figure 1D:
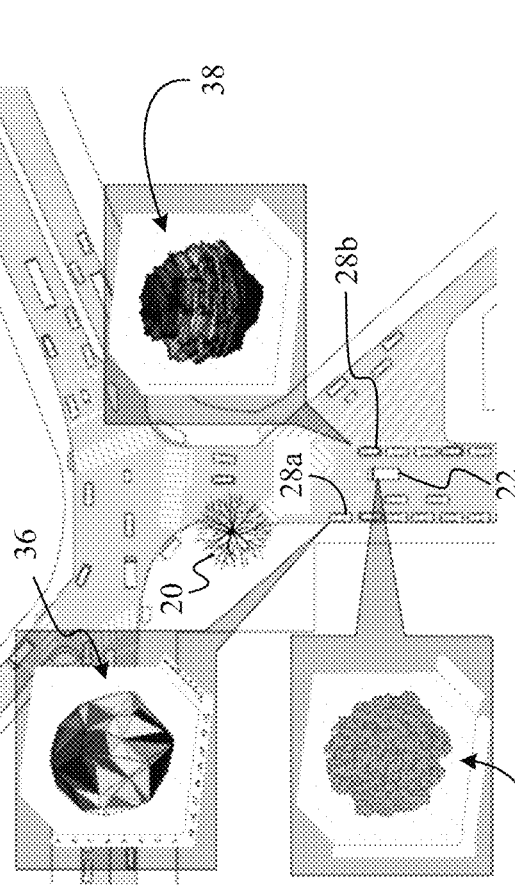
Figure 1C:
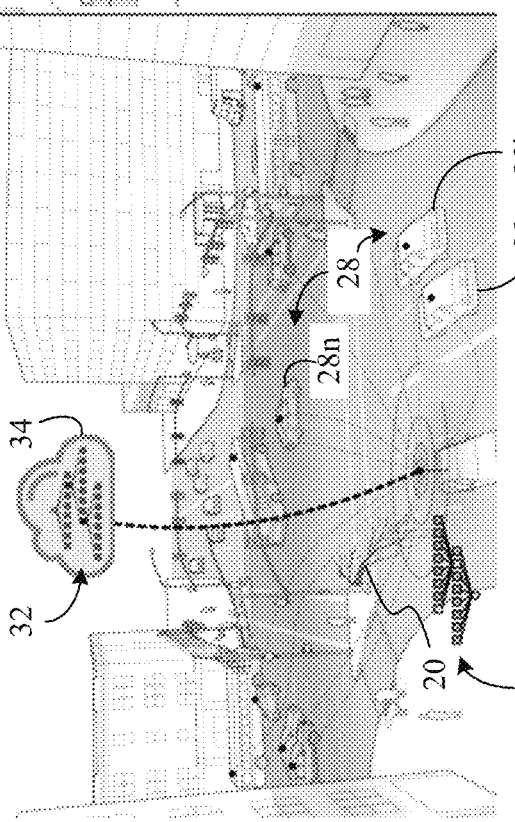

For example, FIG. 1D demonstrates that a first nearby vehicle 28a may report a first volumetric deviation 36 (e.g., at a relatively high resolution) via a V2I link and a second nearby vehicle 28b may report a second volumetric deviation 38 (e.g., at a relatively high resolution) via a V2I link, wherein the volumetric deviations 24, 36, 38 are generated in accordance with different perceptual models. In an embodiment, the cloud computing system 34 integrates the octree representations corresponding to the volumetric deviations 24, 36, 38 into a dynamic layer associated with the crowdsourced map. The high resolution voxels including multimodal data may also be used by the cloud computing system 34 to conduct semantic classification.

For example, the cloud computing system 34 may transform registered collections of sensor signals (e.g., at a sub-symbolical level) into semantic endowed maps, where each voxel includes a distribution of its class and confidence values. More particularly, the sensor signals may be considered "sub-symbolical" to the extent that they have not yet been interpreted as distinctive elements or symbols. Thus, the sub-symbolic level may be the level of raw signals such as, for example, calibrated and registered readings from a LiDAR, undistorted images from a camera, and so forth. The sensor signals may not be referred to as raw signals because they have been partially processed to make them as invariant as possible to the particular sensor. An example of a sub-symbolical level includes a raw captured image that is corrected for lens distortion using specific distortion coefficients to compensate for distortion caused by the lens on that sensor which affects the raw image captured by this camera. When the image is corrected for distortion and color, the interpretation of the image is less dependent on the particular camera. Thus, although the image may have no semantic meaning, it is not raw sensor data but has undergone some processing and hence, the image is sub-symbolic. Once the image is fully processed and objects in the field of view can be recognized or categorized, the information now includes symbols with associated meaning and possible actions may be taken accordingly.

Figure 2:
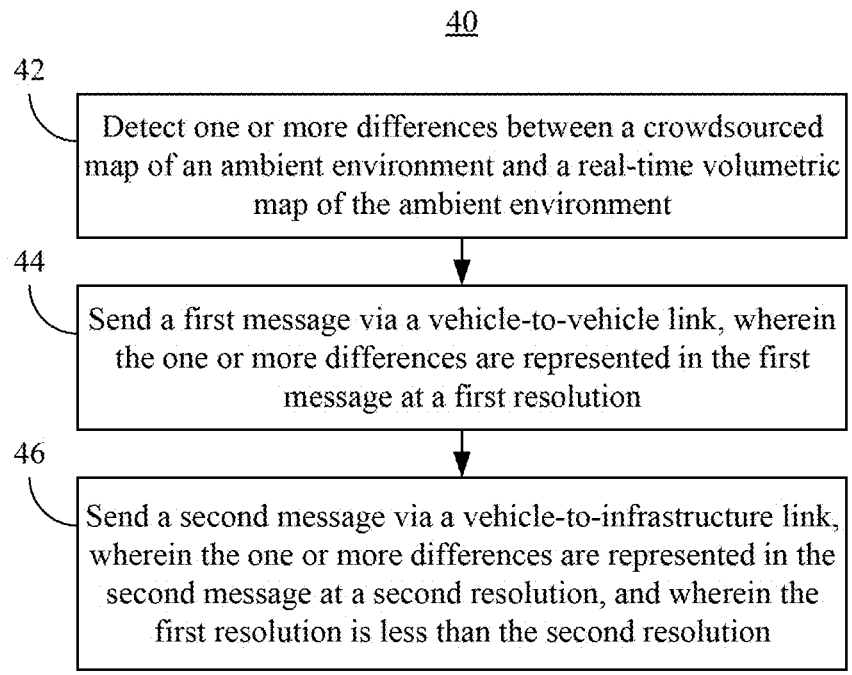
FIG. 2 is a flowchart of an example of a method of operating a vehicle according to an embodiment.

FIG. 2 shows a method 40 of operating a vehicle such as, for example, the vehicle 22 (FIGS. 1A-1D), already discussed. The method 40 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 40 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 42 provides for detecting one or more differences between a crowdsourced map of an ambient environment and a real-time volumetric map of the ambient environment. The difference(s) may be, for example, volumetric deviations corresponding to a hazardous spatial obstruction in the road. In an embodiment, block 42 includes classifying the difference(s) as one or more objects based on size and/or temporal existence. Illustrated block 44 sends a first message via a V2V link, wherein the difference(s) are represented in the first message at a first resolution. Additionally, a second message is sent at block 46 via a V2I link, wherein the difference(s) are represented in the second message at a second resolution. In the illustrated example, the first resolution is less than the second resolution. As already noted, the difference(s) may be represented in the first message and the second message as an octree or portions of an octree. In an embodiment, the second message further includes appearance sensor data (e.g., RGB and/or multi-spectral IR camera images) that enables a cloud computing system to more effectively classify the spatial obstruction and add it to the crowdsourced map. Moreover, when the difference(s) are classified as object(s) based on size and/or temporal existence, the first message and the second message may be dedicated to objects exceeding a size threshold (e.g., larger than X voxels) and a temporal existence threshold (e.g., existing longer than Y rounds of communication between the vehicle and the server). Incorporation of such a temporal fusion technique into the size-based classification may ensure that detected objects are present on the delta for several rounds (e.g., where each round represents a different capture/measurement from sensors).

Figure 3:
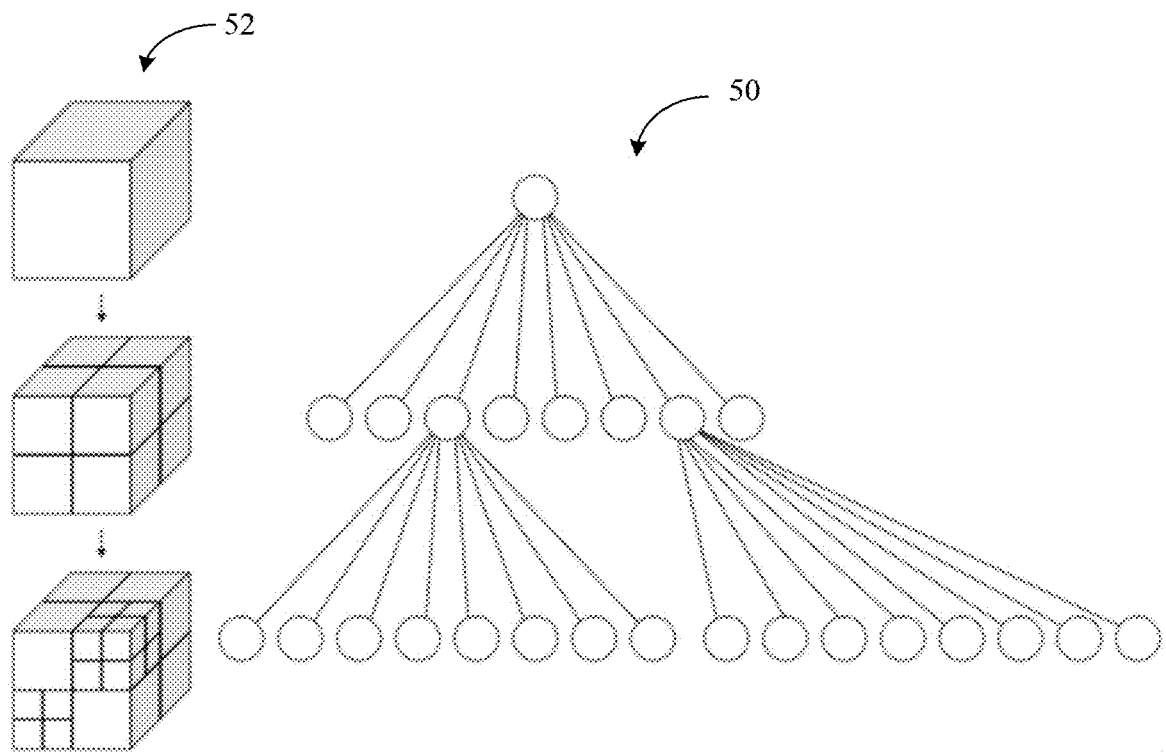
FIG. 3 is an illustration of an example of an octree representation according to an embodiment.

FIG. 3 shows an octree representation 50 of a volume 52 (e.g., 3D space) that contains one or more differences (e.g., deviations, deltas) between a crowdsourced map of an ambient environment and a real-time volumetric map of the ambient environment. The octree representation 50 generally captures not only the presence of new spatial obstructions within the volume 52 but also the absence (e.g., absent local volumetric occupancy) of obstructions that have been removed from the road such as tree or trash.

The octree representation 50 partitions the volume 52 into eight octants, wherein the partitioning is conducted recursively to capture more detail. The octree representation 50 enables distinction to be made between occupied and free spaces. The octree representation 50 also enables extension of the map by adding new information perceived by sensors (e.g., making it particularly useful for representing new objects). In an embodiment, the octree representation 50 is compact and only changes to the octree are communicated to the server and/or other vehicles. In the illustrated example, occupied space is expressed explicitly in the octree representation 50, and empty space is expressed implicitly through internal nodes with no children in the tree. Such an approach makes the size of the octree representation 50 significantly more compact than common existing academic approaches. The resolution may be also adapted by the size of the serialized binary large object.

As already noted, before sharing the delta with others, a size-based classifier that takes the calculated delta as an input and determines whether the delta poses a persistent threat. The classifier deems objects of certain shapes as hazardous because they are large enough to cause problem to driving actions. Such an approach helps to avoid unnecessary reporting of tiny objects on the road and reduces the burden on communication links between vehicles and the cloud server. The approach ensures that new changes are detected with certain confidence because sensors may suffer from transient error. The probability of a voxel or leaf node of the octree representation 50 being occupied depends on the current round of sensor measurement and a previous probability estimate (e.g., that was similarly calculated based on past sensor observations over a given time period). While additional measurements may provide a finer voxel map and more confidence in detecting the exact shape of an object, the additional measurements may consume additional time and resources.

Since the presence of a hazardous object is a safety- and time-critical event, stopping criteria may be used for temporal fusion. For example, the stopping criteria might specify that the resolution of the voxel has reached to a minimal point (e.g., 5-10 cm) or the detected object has been classified. Note that, additional voxelization may be useful for a shape-changing dynamic object (e.g., shaking trash can due to heavy rainfall) and the technology described herein supports voxelization with finer granularity in such a case, even after the stopping criteria is met.

There is a possibility that an on-board neural network classifier may not be able to identify certain objects (e.g., the semantic meaning of the new objects may not be known to the local system of the vehicle). In such case, pixels (e.g., a bounding box) containing unidentifiable objects may be transmitted to the cloud along with the real-time volumetric map delta. Vehicles may have direct wireless links with RSUs, which are eventually connected to the cloud infrastructure. Since the cloud may include a powerful compute server with an ensemble of better trained neural network (NN) classifiers, it typically has better chance of identifying these objects.

Figure 4:
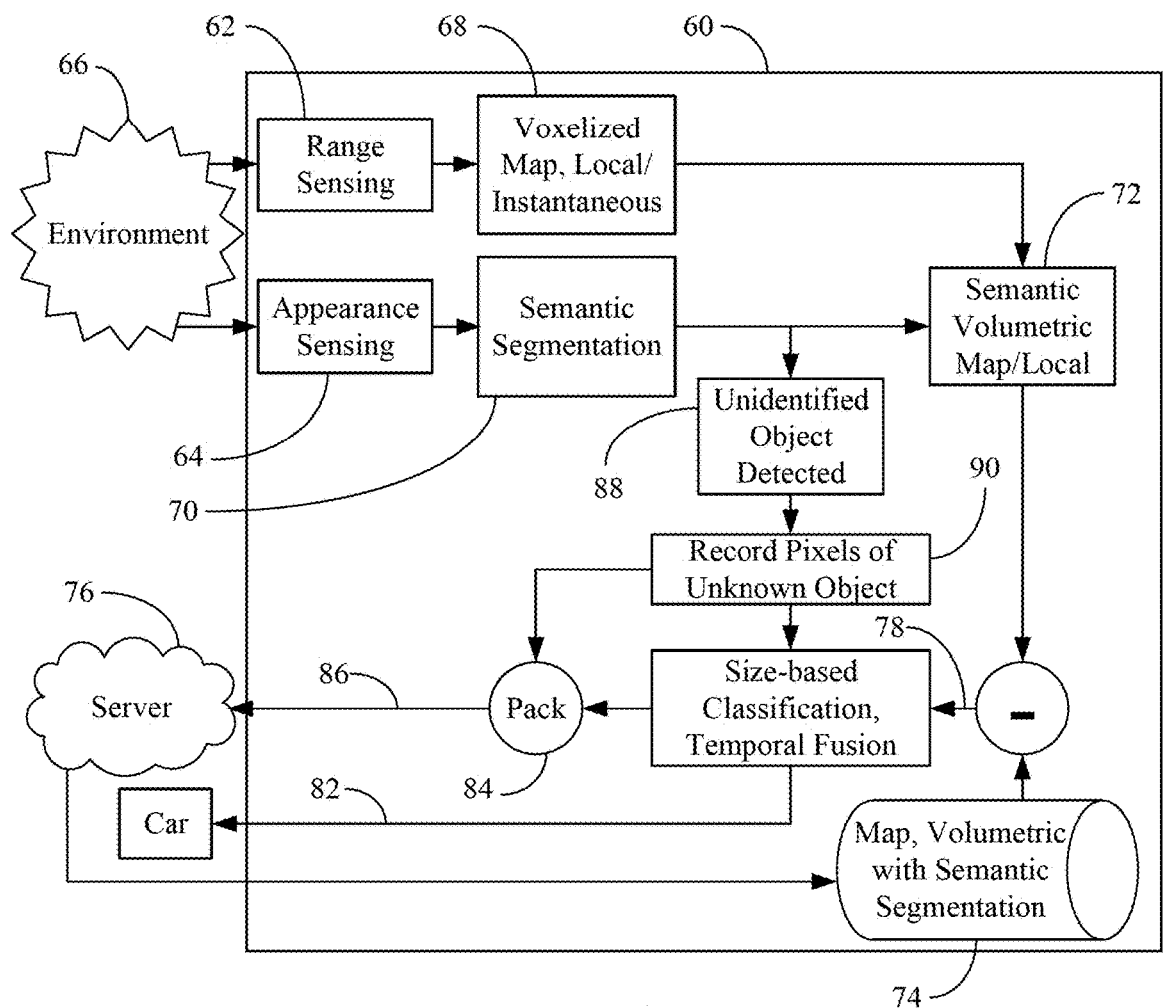
FIG. 4 is a block diagram of an example of a vehicle subsystem according to an embodiment.

FIG. 4 shows a vehicle subsystem 60 that uses range sensing 62 (e.g., stereo vision, ultrasonic, radar, LiDAR) and appearance sensing 64 (e.g., RGB camera, vision camera, multi-spectral IR) to record and/or capture an ambient environment 66 (e.g., road, intersection). The range sensing 62 generates a voxelized map 68 with local and/or instantaneous data and the appearance sensing 64 generates semantic segmentation data 70. In the illustrated example, the voxelized map 68 and the semantic segmentation data 70 are used to generate a real-time semantic volumetric map 72 that is local to the subsystem 60. The local semantic volumetric map 72 is subtracted from a semantic volumetric map 74 (e.g., generated using crowdsourcing or other similar technique) that is received from a server 76 that conducts classifications and map updates. Accordingly, a map delta 78 is input to a sized-based classification and temporal fusion filter 80, wherein a first message 82 is generated for a V2V link based on the filtered map delta 78. The first message 82 includes a compressed (e.g., low resolution) volumetric representation of dynamic objects. The output of the filter 80 may also be provided to a packetization process 84 that sends a second message 86 to the server 76. If an unidentified object detector 88 determines that the semantic segmentation data 70 is incomplete, a pixel recorder 90 documents the pixels corresponding to the unknown object(s). In the illustrated example, the output of the pixel recorder 90 is also provided to the packetization process 84. Accordingly, the second message 86 may include the filtered map data and pixels with unidentified objects.

Figure 5:
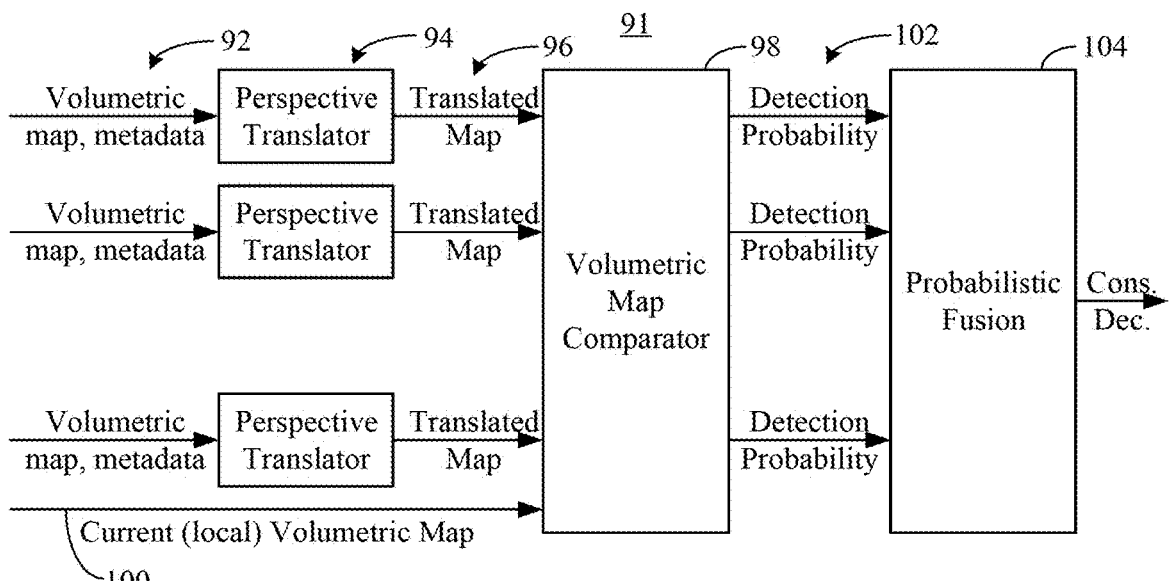
FIG. 5 is a block diagram of an example of a consensus building pipeline according to an embodiment.

FIG. 5 demonstrates how reports or observations from multiple vehicles may be used by a consensus building pipeline 91 to validate reported changes before merging them with the current version of HD map. A hazardous object or obstacle is likely to be observed by multiple cameras and other sensors from different vantage points. Only some of the vehicles, however, have a good observation. The illustrated solution provides for the individual vehicles to communicate their respective probabilities from their respective object detection pipeline, wherein the probability information may be used to validate their observations. In an embodiment, the validation is conducted both by the server managing the HD map generation as well as the nearby vehicles generating consensus decisions. Majority voting (e.g., where the voting weight is a function of the detection probability) may be used to generate a consensus decision amongst the observers.

The weights may be computed empirically by adjusting weighted kernel similarity on the Mahalanobis distance (e.g., quantifying how many standard deviations away a point P is from the mean of a distribution D) or the Bhattacharyya distance (e.g., measuring the similarity of two probability distributions) between individual perceptual distributions comparing with a shallow artificial neural network to conduct the voting. This scheme also addresses issues with rogue/bad actors who might create and report incorrect observations as a consensus decision is being built. In addition to volumetric representations of dynamic objects (e.g., identifying all of the voxel space that a given object occupies), input data 92 includes meta-data such as classifier information shared by each participating vehicle.

The input data 92 may be processed by a set of perspective translators 94 that generate translated maps 96. In this regard, the translated maps 96 are generated with respect to each vehicle's vantage point and its reference frame. In the case of multiple sensors in a vehicle, the vantage point would be a fused vantage point for that vehicle. In an embodiment, the HD map itself assumes a different vantage point as do the other observers (e.g., vehicles). The kinematic frames may be registered to align observations (e.g., as described by Qiu, et al. in "AVR: Augmented Vehicular Reality," MobiSys '18, Jun. 10-15, 2018). This registration may be conducted using a perspective transformation. For example, a rigid motion transformation matrix $T_{cw}$ might contain a 3×3 rotation matrix and a 3-element translation vector, wherein the transformation matrix describes how to transform a position from one camera's coordinate frame to another. A number of approaches may be employed to compute the transformation matrix as presented below:

For each vehicle, the GPS (Global Positioning System) coordinates and inertial sensor may be used to obtain a full 6-DOF (degrees of freedom) and compute relative pose (e.g., rotation and translation) given this information. The issue with this approach may be that standard GPS receivers typically have large error (e.g., on the order of five meters). This error is especially true in urban canyons as well as other dense urban environments. Moreover, precision GPS systems may require extensive stationary calibration times or complex equipment configurations. Additionally, such systems may be relatively expensive and not main stream. Some work done (e.g., by Vanderbilt researchers Hedgecock, et al. in "Accurate Real-Time Relative Localization Using Single-Frequency GPS", SenSys'14, Nov. 3-5, 2014), may have achieved sub-meter accuracy using only a single-frequency GPS by using a network of receivers that share raw satellite measurements. It is possible that each participating node is able to localize all other nodes in the network using pairwise combinations of satellite observations. Thus, each node may be able to create an internal mapping of the locations of the "remote" nodes in terms of a set of 3D position vectors with respect to its own local coordinate system.

Another localization technique is to leverage the fact the vehicles may have overlapping fields of view and use stereo-vision based simultaneous localization and mapping (SLAM) techniques to localize the vehicles. In the simplest scenario, each vehicle is visible in the others' field-of-view. Since each vehicle is aware of its own calibration, it can precisely locate the other vehicle with respect to its own reference frame to a relatively high degree of accuracy. There are possible scenarios, however, in which the vehicles may not be able to see each other. In such cases, they rely on external entities that are visible to both vehicles. Specifically, given a pair of calibrated stereo images and technology to automatically detect a vehicle bounding box in stereo images, the vehicle may be triangulated. In an embodiment, a dense disparity map of the target vehicle is also computed. Thus, given an object of interest on the target vehicle, its depth and thus translation vector from one of the stereo cameras on the reference vehicle may be computed. Given the depth map, the surface normal of the object of interest may also be computed. In one example, the surface normal would then be used to compute the relative orientation (e.g., rotation between the reference cameras and the object of interest), thereby yielding the full relative pose between two objects on the two vehicles.

An alternate scheme is to leverage already existing global sparse 3D maps of the surrounding scene. In such a case, a vehicle computes a sparse 3D map of the scene imaged by its multi-camera system, LiDAR, radar, etc., and then extracts 3D feature points and matches these extracted points with the global sparse 3D map. The vehicle may then localize itself versus the global coordinate system that is used in the HD map. Other vehicles may also localize themselves versus the same reference. Accordingly, transforming different vantage points to a common vantage point for reference may be relatively straightforward.

Another scheme is to align the volumetric map directly by using the semantic information to find common objects and their location in the volumetric space. This alignment may be used to compute the appropriate transformation matrix. The volumetric maps might be in raw format and aligned using iterative closest point (ICP) methods (e.g., as described by Besl et al. in "A Method for Registration of 3-D Shapes, IEEE Transactions on Pattern Analysis and Machine Intelligence, Vol. 14, No. 2, February 1992). Otherwise, the octrees corresponding to each volumetric map may themselves be aligned without explicit computation of the transformation matrix T (e.g., as described by Eggert et al. in Octree-Based SIMD Strategy for ICP Registrations and Alignment of 3D Point Clouds, ISPRS Annals of the Photogrammetry, Remote Sensing and Spatial Information Sciences, Vol. 1-3, 2012).

The translated maps 96 and a current (e.g., local) volumetric map 100 are input to a volumetric map comparator 98, which generates a set of detection probabilities 102. In some embodiments, the detection probabilities may leverage the respective probabilities from each observer's respective object detection pipeline probabilities. Additionally, a probabilistic fusion component 104 may generate a consensus decision based on the set of detection probabilities 102. In some embodiments, this could be done using the Mahalanobis or Bhattacharyya difference, as already discussed. Accordingly, by taking diversity among classifiers into consideration, the illustrated consensus building pipeline 91 becomes robust as certain classifiers are more accurate in classifying objects captured from various angles.

Figure 6:
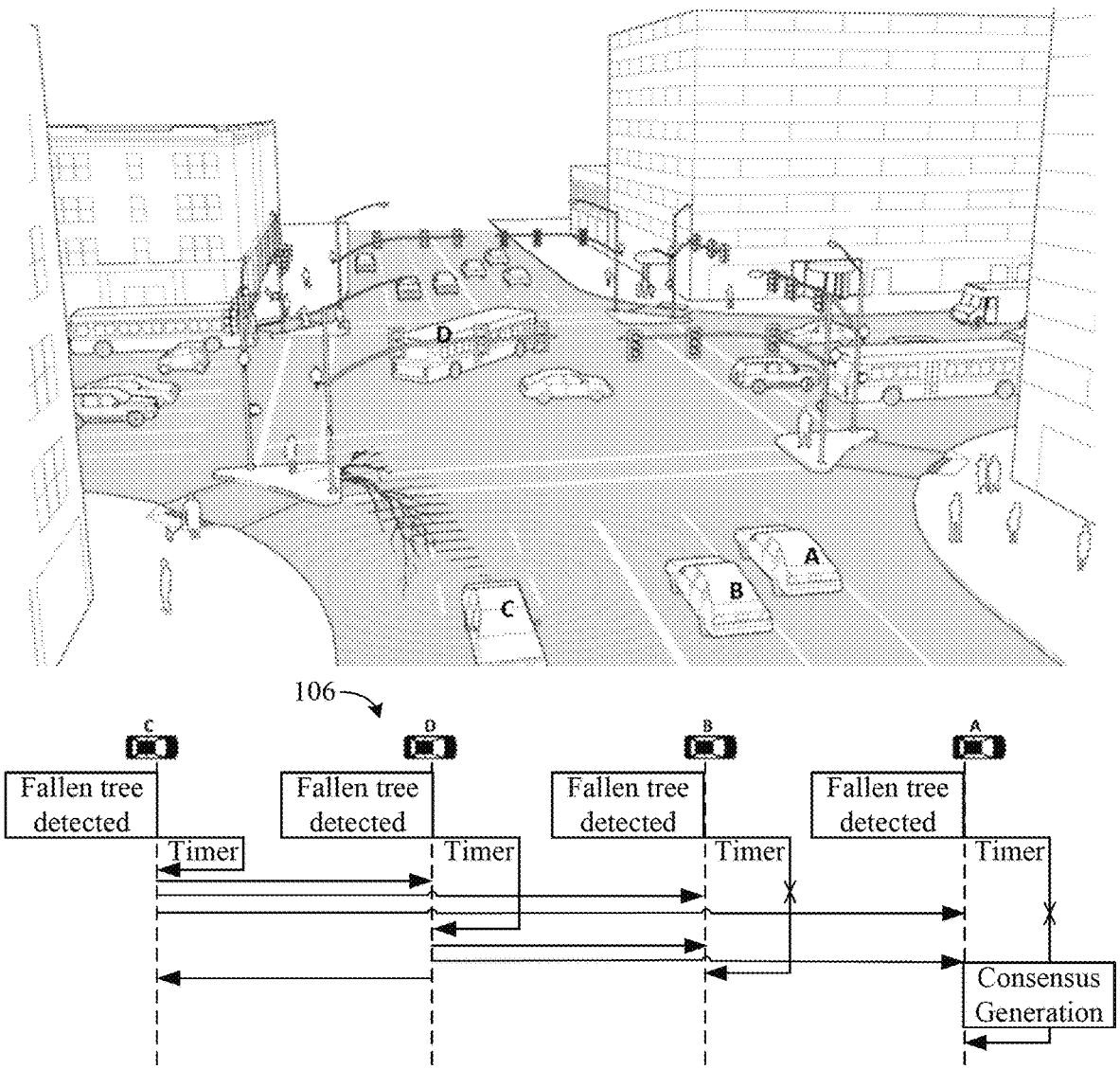
FIG. 6 is an illustration of an example of a crowdsourced messaging sequence according to an embodiment.

Turning now to FIG. 6, while the flow of consensus building may be similar for both the cloud computing system and neighboring vehicles, the type of information shared over the V2I link and V2V may be different, as already discussed. In the case of V2V communications, a coarse-grained representation of the volumetric map is shared to reduce the amount of data transfer within the vehicular network. Sharing information over V2V links, however, might still cause redundant and excessive data transmissions in, for example, a dense urban environment. In the illustrated messaging sequence 106, a distributed intelligent timer design controls redundant data transmissions over V2V links. Upon detection of a dynamic object (e.g., such as fallen tree) locally, each vehicle initiates/starts a timer in a distributed fashion, where the timer value is inversely proportional to the confidence score (i.e., probability) in detecting the object. The timer for the vehicle with higher confidence score is likely to expire first compared to the others.

Once the timer is fired (e.g., expires), the vehicle broadcasts the volumetric representation of dynamic objects, classifier meta-data, age of information (AoI) for the detected objects, etc., within its neighborhood. For example, the AoI may help other vehicles check/confirm the validity of received information. Each receiving neighboring vehicle compares its local representation with the received representation and cancels its respective timer if it has a lower confidence or redundant volumetric representation. After a configurable amount of time, every vehicle applies technology such as, for example, the consensus building pipeline 91 (FIG. 5) over the collected information to make a final object detection decision.

In the illustrated example, four vehicles A, B, C, and D implement the V2V-based consensus development solution. Each of the four vehicles detects a fallen tree with certain probabilities or confidence and starts a timer to report the volumetric representation of the tree. Vehicle C is assumed to have better probability in detecting the tree, where the vehicle D also has good probability of detecting the tree but from a different vantage point. In the illustrated messaging sequence 106, vehicle C's timer expires first as it has higher probability in detecting the tree. In response to the timer expiration, vehicle C broadcasts its volumetric representation and classifier information to the neighboring area. Upon reception of this broadcast, vehicles B and A stop/cancel their respective timers as they have observed the tree from almost the same angle as vehicle C and have redundant volumetric representations. Vehicle D, however, does not stop its timer as it has a different volumetric representation (e.g., volumetric space containing the tree). Eventually, the timer of vehicle D expires, which causes vehicle D to broadcast its own representation and classifier information. Finally, vehicle A takes its local representation and information from vehicle C, D into consideration to determine a consensus on the presence of a fallen tree.

Figure 7:
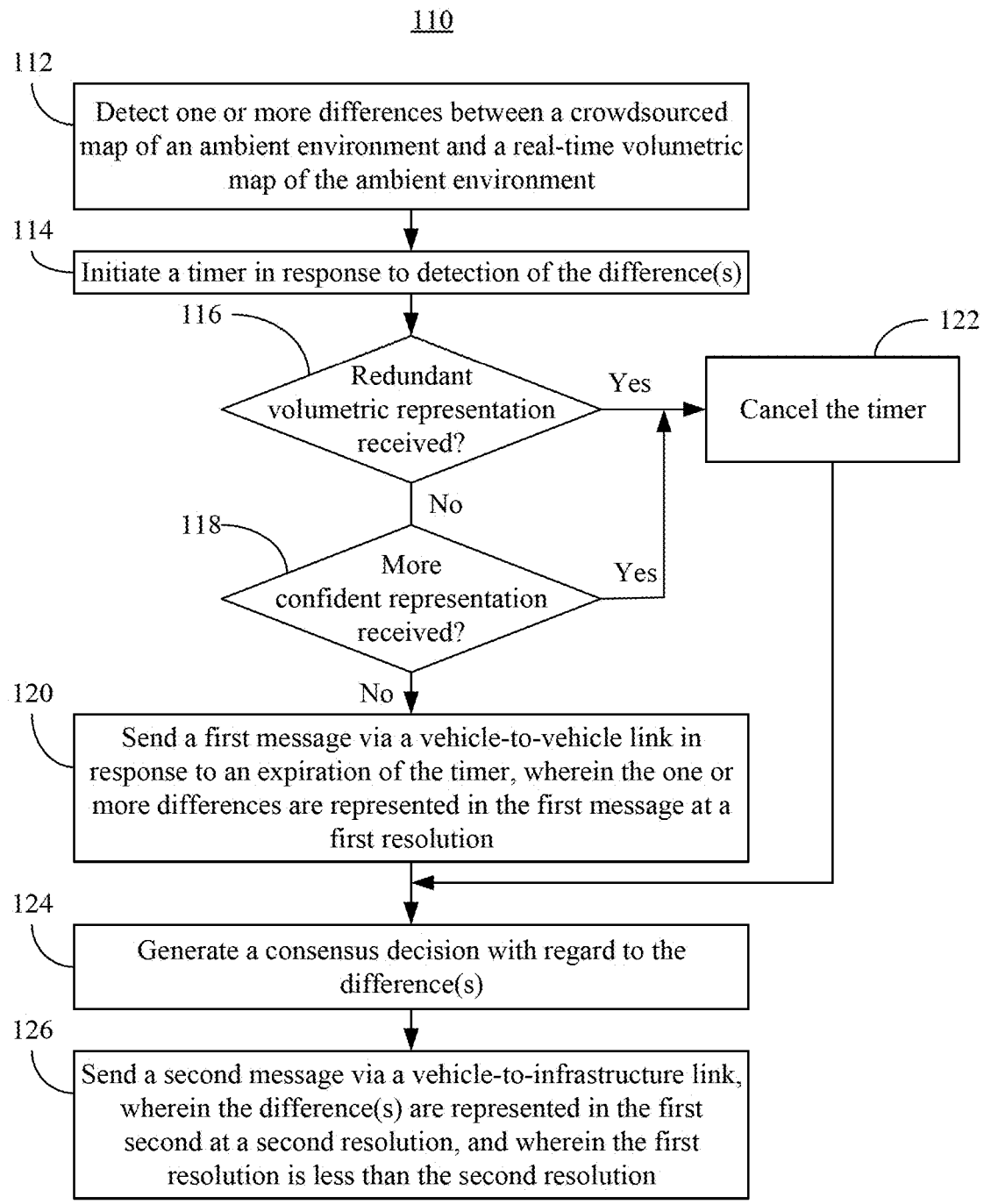
FIG. 7 is a flowchart of an example of a method of a more detailed method of operating a vehicle according to an embodiment.

FIG. 7 shows a more detailed method 110 of operating a vehicle. The method 110 may generally be implemented in a vehicle such as, for example, the vehicle 22 (FIGS.

1A-1D), already discussed. More particularly, the method 110 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 112 provides for detecting one or more differences between a crowdsourced map of an ambient environment and a real-time volumetric map of the ambient environment. As already noted, the difference(s) may be, for example, volumetric deviations corresponding to a hazardous spatial obstruction in the road. In an embodiment, block 112 includes classifying the difference(s) as one or more objects based on size and/or temporal existence. Illustrated block 114 initiates a timer in response to detection of the difference(s). In an embodiment, the timer is initiated to a value that is inversely proportional to a confidence score associated with the detection of the difference(s).

A determination may be made at block 116 as to whether a redundant volumetric representation has been received via a V2V link prior to expiration of the timer. If not, a determination is made at block 118 as to whether a more confident (e.g., within a tolerance range) volumetric representation has been received via a V2V link prior to expiration of the timer. If not, block 120 sends a first message via a V2V link, wherein the difference(s) are represented in the first message at a first resolution. If either it is determined at block 116 that a redundant volumetric representation has been received or it is determined at block 118 that a more confident volumetric representation has been received, block 122 cancels the timer and the method bypasses block 120. Bypassing block 120 may reduce redundant and excessive data transmissions in, for example, a dense urban environment.

Illustrated block 124 generates a consensus decision with regard to the difference(s). In an embodiment, block 124 generates the consensus decision based on a set of detection probabilities and takes diversity among classifiers into consideration. A second message is sent at block 126 via a V2I link, wherein the difference(s) are represented in the second message at a second resolution. In the illustrated example, the first resolution is less than the second resolution. As already noted, the difference(s) may be represented in the first message and the second message as an octree. In an embodiment, the second message further includes appearance sensor data (e.g., RGB and/or multi-spectral IR camera images) that enables the cloud computing system to more effectively classify spatial obstructions and add them to the crowdsourced map. Moreover, when the difference(s) are classified as object(s) based on size and/or temporal existence, the first message and the second message may be dedicated to objects exceeding a size threshold (e.g., larger than X voxels) and a temporal existence threshold (e.g., existing longer than Y rounds of communication between the vehicle and the server). Incorporation of such a temporal fusion technique into the size-based classification may ensure that detected objects are present on the delta for several rounds (e.g., where each round represents a different capture/measurement from sensors).

FIGS. 8A-8D show a voxel semantic segmentation for a road containing a spatial obstruction such as, for example, a bicycle 130. In this regard, there may be a probability that the on-board neural network classifier of the vehicle may not be able to identify certain objects. For example, the semantic meaning of the new objects may not be known to the local system. In such case, pixels (e.g., a bounding box) containing unidentifiable objects such as the bicycle 130 may be transmitted to the cloud computing system, in addition to the volumetric map delta, as already noted. In an embodiment, the cloud computing system has a relatively powerful compute server with an ensemble of better trained NN classifiers. Accordingly, the cloud computing system may have a better chance of identifying the bicycle 130. In the illustrated example, a sensor output includes a 3D point cloud 132 that is used to create a feature input 134. A deep neural network 136 (e.g., including one or more hidden layers) conducts inferences (e.g., pixel-wise predictions) on a forward propagation path 138, wherein learning is conducted on a backward propagation path 140. In an embodiment, the output is a set of semantic classified voxels 142.

FIG. 9 shows a V2I interaction between a vehicle 144 and a server 146. In the illustrated example, the server 146 maintains a map database and volumetric map 148 with semantic segmentations is stored on the vehicle 144. The vehicle 144 issues requests 150 for map downloads and the server sends or pushes messages 152 containing updated maps. The frequency of sending the messages 152 may be controlled with a periodic timer.

FIGS. 10A-10D show an example of a probabilistic fusion of multiple map differences from multiple vehicles. In general, a vantage point/pose is the particular location (e.g., X, Y, Z-coordinates) and orientation (roll, pitch and yaw angles) of an observer (e.g., a vehicle as a whole or a particular sensor) that is capturing a scene. More particularly, a first vantage point 154 and a second vantage point 156 may capture different voxels containing a surface 158 of an object. The geometric relation between the different vantage points 154, 156 shows which voxels may be captured with deviations. In one example, a 2D (two-dimensional) discretized grid function represents the voxels captured from the different vantage points 154, 156 as a set of Gaussian grids 162 (162a-162b, e.g., density elevations). The Gaussian grids 162 are shown overlapping to denote the case when two different vehicles capture (e.g., with respect to sense, detect and classify operations) the surface 158 in relatively close, but still different positions (in terms of longitude, latitude and elevation in geo-coordinates or another geo-representation such as Mercator). Thus, a first Gaussian grid 162a may correspond to the first vantage point 154 and a second Gaussian grid 162b may correspond to the second vantage point 156, wherein the Gaussian grids 162 have different degrees of confidence (e.g., namely, the Sigma of each Gaussian).

Both observations may be combined in such a way that the result optimally integrates the measurements, which may include more than the illustrated two measurements. For two sets of voxels, it is possible to represent them as having a density in terms of a Gaussian distribution. In an embodiment, the Gaussian distribution is represented as the one or more Gaussian grids 162 or a continuous fusion using Bayes filtering, enabling the determination of the maximal posterior density resulting from the combination of both sets. Thus, a set of curves 160 (160a-160d) might include a fusion curve 160d that uses a form of Bayesian filtering to combine a first observation curve 160a, a second observation curve 160b and a third observation curve 160c (e.g., formally, $G_i(\mu_i \leftarrow i^{th}$ mean, $\sigma_i \leftarrow i^{th}$ standard deviation). In the illustrated plot, the operation used is the continuous conjunction, namely the continuous product point-to-point. The continuous product point-to-point may be better interpreted as: what is the probability that the obstacle is at point "x" based on the Gaussian-observation 1 AND Gaussian-observation 2 AND Gaussian-observation 3 or $P(x)=G_1(x, \mu_1, \sigma_1)*G_2(x, \mu_2, \sigma_2)*G_3(x, \mu_3, \sigma_3)$.

In the case of a voxelized point cloud 164, this process can result in multimodal regions at high density in such a way that multiple scans coming from diverse vehicles are fused, producing multiple disconnected regions called fuse object regions 166. Moreover, for safety reasons, a margin of, for example, 25-50 cm may be added to create a volumetric region of interest—a bounding box called a safety margin region 168.

Thus, the illustrated solution probabilistically and optimally integrates multiple sensor readings coming from diverse sources or vehicles. The use of Bayesian filtering in terms of voxel density enables integration and resolution of inconsistencies in the diverse data samples. This integration and resolution does not only fuse the data but also splits or melts multiple connected components based on density. The result may be multiple smaller obstacles or a larger one. The use of a probabilistic approach enables overcoming the uncertainties in self-localization of each vehicle as well as calibration artifacts in each of the sensors. Finally, the safety margins 168 are added to ensure that no vehicle collides with small parts of the object which have not been captured by any sensor (e.g., the branches of a fallen tree).

Figure 11:
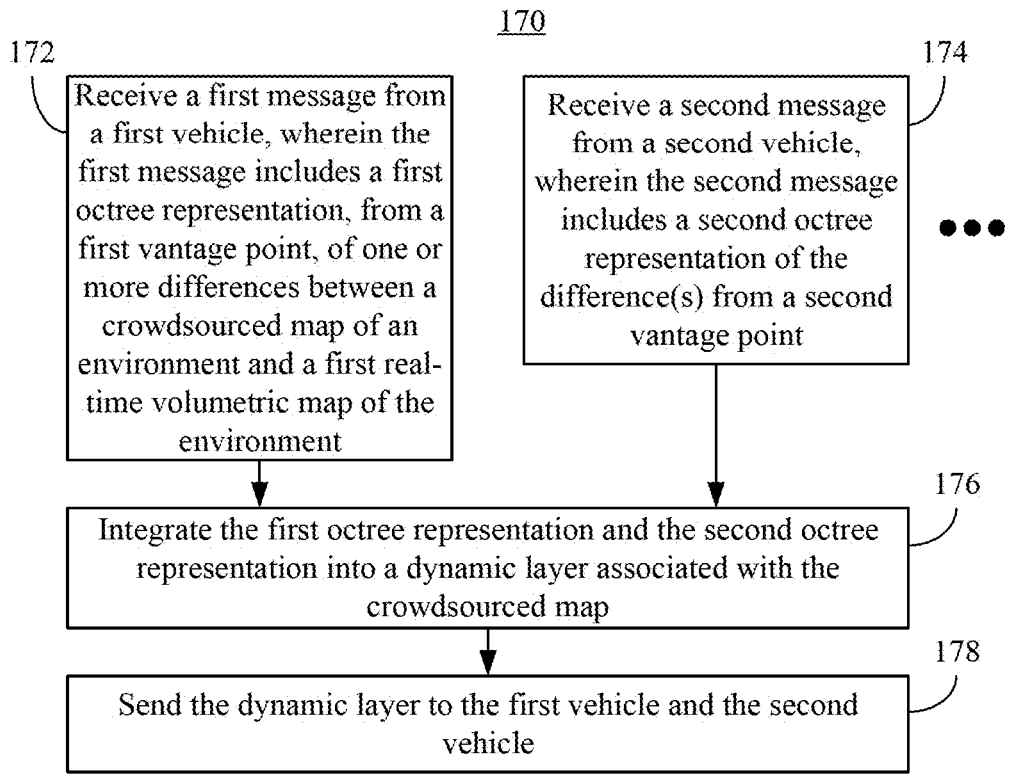
FIG. 11 is a flowchart of an example of a method of operating a computing system according to an embodiment.

FIG. 11 shows a more detailed method 170 of operating a computing system. The method 170 may generally be implemented in a computing system such as, for example, the cloud computing system 34 (FIG. 1C) and/or the server 76 (FIG. 4), already discussed. More particularly, the method 170 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 172 provides for receiving a first message from a first vehicle, wherein the first message includes an octree representation, from a first vantage point, of one or more difference(s) between a crowdsourced map of an environment and a first real-time volumetric map of the environment. Additionally, a second message is received from a second vehicle at block 174, wherein the second vehicle includes a second octree representation of the difference(s) from a second vantage point. Block 176 integrates the first octree representation and the second octree representation into a dynamic layer associated with the crowdsourced map, wherein the dynamic layer is sent to the first vehicle and the second vehicle at illustrated block 178.

Figure 12:
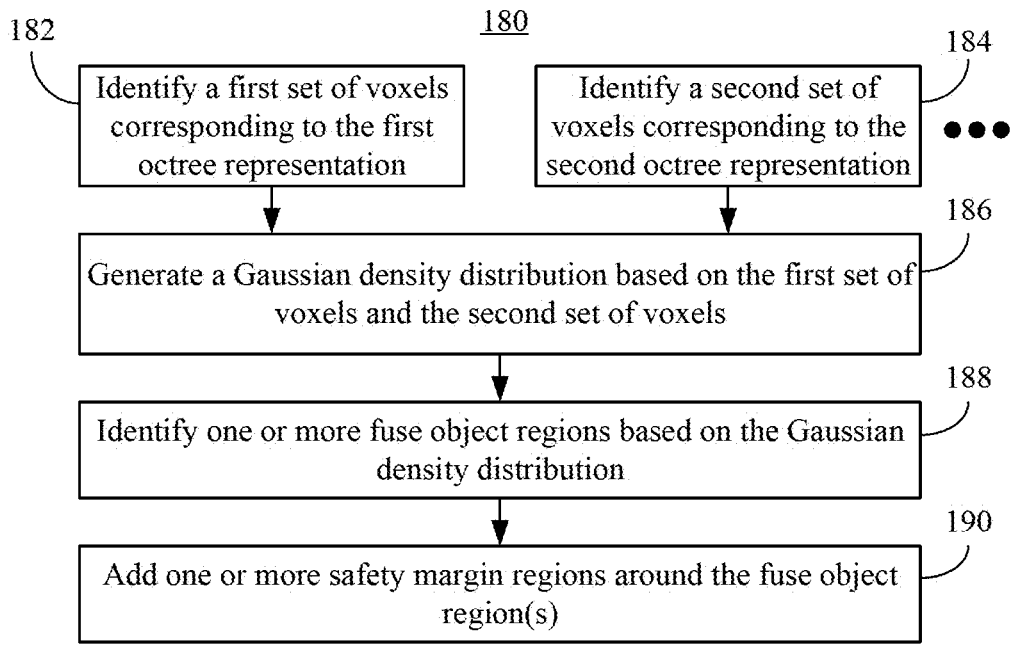
FIG. 12 is a flowchart of an example of a method of integrating octree representations according to an embodiment.

FIG. 12 shows a method 180 of integrating octree representations. The method 180 may generally be substituted for processing block 176 (FIG. 11), already discussed. More particularly, the method 180 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 182 provides for identifying a first set of voxels corresponding to a first octree representation, wherein a second set of voxels corresponding to a second octree representation are identified at block 184. Block 186 generates a Gaussian density distribution based on the first set of voxels and the second set of voxels. Additionally, block 188 may identify one or more fuse object regions based on the Gaussian density distribution. In an embodiment, one or more safety margin regions are added around the fuse object region(s) at block 190.

Figure 13:
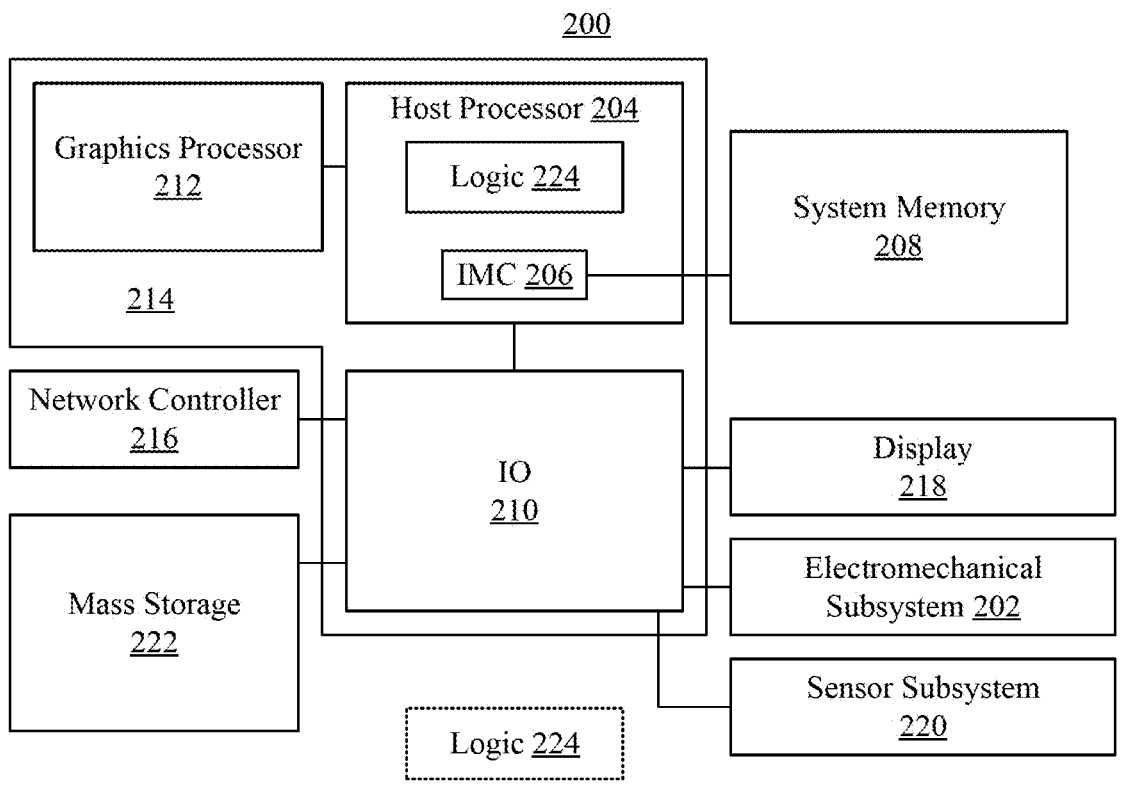
FIG. 13 is a block diagram of an example of a performance-enhanced platform according to an embodiment.

Turning now to FIG. 13, a performance-enhanced platform 200 (e.g., vehicle, server) is shown. In the illustrated example, the platform 200 is operated as a vehicle and includes an electromechanical subsystem 202 (e.g., drive train, steering, navigation, onboard controller, event data recorder/EDR) and a host processor 204 (e.g., central processing unit/CPU with one or more processor cores) having an integrated memory controller (IMC) 206 that is coupled to a system memory 208. If the platform 200 is operated as a server (e.g., cloud computing system), the electromechanical subsystem 202 may be eliminated. The illustrated platform 200 also includes an input output (10) module 210 implemented together with the host processor 204 and a graphics processor 212 on a semiconductor die 214 as a system on chip (SoC). The IO module 210 communicates with, for example, a network controller 216 (e.g., wireless and/or wired, capable of maintaining a V2V link and a V2I link), a display 218, the electromechanical subsystem 202, a sensor subsystem 220 (e.g., lidar, radar, sonar, cameras, IR sensors, etc., or any combination thereof) and mass storage 222 (e.g., hard disk drive/HDD, optical disk, solid state drive/SSD, flash memory).

The host processor 204 may include logic 224 (e.g., logic instructions, configurable logic, fixed-functionality hardware logic, etc., or any combination thereof) to perform one or more aspects of the method 40 (FIG. 2), the method 110 (FIG. 7), the method 170 (FIG. 11), and/or the method 180 (FIG. 12), already discussed. Thus, when the platform 200 is operated as a vehicle, the logic 224 detects one or more differences between a crowdsourced map of an ambient environment and a real-time volumetric map of the ambient environment and sends a first message via a V2V link, wherein the difference(s) are represented in the first message at a first resolution. Additionally, logic 224 may send a second message via a V2I link, wherein the difference(s) are represented in the second message at a second resolution, and wherein the first resolution is less than the second resolution.

When the platform 200 is operated as a server, the illustrated logic 224 receives a first message from a first vehicle, wherein the first message includes a first octree representation, from a first vantage point, of one or more differences between a crowdsourced map of an environment and a first real-time volumetric map of the environment. The logic 224 may also receive a second message from a second vehicle, wherein the second message includes a second octree representation of the difference(s) from a second vantage point. In an embodiment, the logic 224 integrates the first octree representation and the second octree representation into a dynamic layer associated with the crowdsourced map. The platform 200 may be considered to be performance-enhanced to the extent that the logic 224 reduces wireless bandwidth consumption, reduces latency and/or improves safety. While the logic 224 is shown in the host processor 204, the logic 224 may be located elsewhere in the platform 200.

Figure 14:
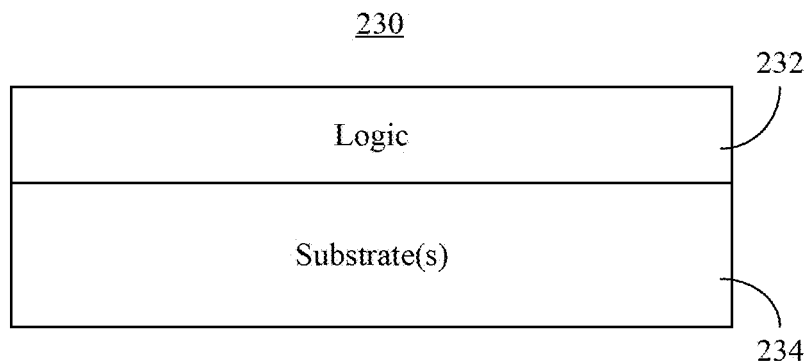
FIG. 14 is an illustration of an example of a semiconductor package apparatus according to an embodiment.

FIG. 14 shows a semiconductor package apparatus 230. The apparatus 230 may include logic 232 to implement one or more aspects of the method 40 (FIG. 2), the method 110 (FIG. 7), the method 170 (FIG. 11), and/or the method 180 (FIG. 12), already discussed, and may be readily substituted for the logic 224 (FIG. 13), already discussed. The illustrated apparatus 230 includes one or more substrates 234 (e.g., silicon, sapphire, gallium arsenide), wherein the logic 232 (e.g., transistor array and other integrated circuit/IC components) is coupled to the substrate(s) 234. The logic 232 may be implemented at least partly in configurable logic or fixed-functionality logic hardware. In one example, the logic 232 includes transistor channel regions that are positioned (e.g., embedded) within the substrate(s) 234. Thus, the interface between the logic 232 and the substrate(s) 234 may not be an abrupt junction. The logic 232 may also be considered to include an epitaxial layer that is grown on an initial wafer of the substrate(s) 234.

ADDITIONAL NOTES AND EXAMPLES

Example 1 includes a semiconductor apparatus comprising one or more substrates and logic coupled to the one or more substrates, wherein the logic is implemented at least partly in configurable logic or fixed-functionality hardware logic, the logic coupled to the one or more substrates to detect one or more differences between a crowdsourced map of an ambient environment and a real-time volumetric map of the ambient environment, send a first message via a vehicle-to-vehicle link, wherein the one or more differences are represented in the first message at a first resolution, and send a second message via a vehicle-to-infrastructure link, wherein the one or more differences are represented in the second message at a second resolution, and wherein the first resolution is less than the second resolution.

Example 2 includes the semiconductor apparatus of Example 1, wherein the one or more differences are represented in the first message and the second message as an octree.

Example 3 includes the semiconductor apparatus of Example 1, wherein the second message further includes appearance sensor data.

Example 4 includes the semiconductor apparatus of Example 1, wherein the logic coupled to the one or more substrates is to classify the one or more differences as one or more objects based on size and temporal existence.

Example 5 includes the semiconductor apparatus of Example 4, wherein the first message and the second message are dedicated to objects exceeding a size threshold and a temporal existence threshold.

Example 6 includes the semiconductor apparatus of any one of Examples 1 to 5, wherein the logic coupled to the one or more substrates is to initiate a timer in response to detection of the one or more differences, cancel the timer if a redundant volumetric representation is received via the vehicle-to-vehicle link prior to expiration of the timer, wherein the first message is sent in response to an expiration of the timer if the redundant volumetric representation is not received via the vehicle-to-vehicle link prior to expiration of the timer, and generate a consensus decision with regard to the one or more differences.

Example 7 includes the semiconductor apparatus of Example 6, wherein the timer is initiated to a value that is inversely proportional to a confidence score associated with the detection of the one or more differences.

Example 8 includes at least one computer readable storage medium comprising a set of instructions, which when executed by a vehicle, cause the vehicle to detect one or more differences between a crowdsourced map of an ambient environment and a real-time volumetric map of the ambient environment, send a first message via a vehicle-to-vehicle link, wherein the one or more differences are represented in the first message at a first resolution, and send a second message via a vehicle-to-infrastructure link, wherein the one or more differences are represented in the second message at a second resolution, and wherein the first resolution is less than the second resolution.

Example 9 includes the at least one computer readable storage medium of Example 8, wherein the one or more differences are represented in the first message and the second message as an octree.

Example 10. The at least one computer readable storage medium of Example 8, wherein the second message further includes appearance sensor data.

Example 11 includes the at least one computer readable storage medium of Example 8, wherein the instructions, when executed, cause the vehicle to classify the one or more differences as one or more objects based on size and temporal existence.

Example 12 includes the at least one computer readable storage medium of Example 11, wherein the first message and the second message are dedicated to objects exceeding a size threshold and a temporal existence threshold.

Example 13 includes the at least one computer readable storage medium of any one of Examples 8 to 12, wherein the instructions, when executed, cause the vehicle to initiate a timer in response to detection of the one or more differences, cancel the timer if a redundant volumetric representation is received via the vehicle-to-vehicle link prior to expiration of the timer, wherein the first message is sent in response to an expiration of the timer if the redundant volumetric representation is not received via the vehicle-to-vehicle link prior to expiration of the timer, and generate a consensus decision with regard to the one or more differences.

Example 14 includes the at least one computer readable storage medium of Example 13, wherein the timer is initiated to a value that is inversely proportional to a confidence score associated with the detection of the one or more differences.

Example 15 includes a semiconductor apparatus comprising one or more substrates, and logic coupled to the one or more substrates, wherein the logic is implemented at least partly in configurable logic or fixed-functionality hardware logic, the logic coupled to the one or more substrates to receive a first message from a first vehicle, wherein the first message includes a first octree representation, from a first vantage point, of one or more differences between a crowdsourced map of an environment and a first real-time volumetric map of the environment, receive a second message from a second vehicle, wherein the second message includes a second octree representation of the one or more differences from a second vantage point, and integrate the first octree representation and the second octree representation into a dynamic layer associated with the crowdsourced map.

Example 16 includes the semiconductor apparatus of Example 15, wherein the logic coupled to the one or more substrates is to identify a first set of voxels corresponding to the first octree representation, identify a second set of voxels corresponding to the second octree representation, and generate a Gaussian density distribution based on the first set of voxels and the second set of voxels.

Example 17 includes the semiconductor apparatus of Example 16, wherein the logic coupled to the one or more substrates is to identify one or more fuse object regions based on the Gaussian density distribution.

Example 18 includes the semiconductor apparatus of Example 17, wherein the logic coupled to the one or more substrates is to add one or more safety margin regions around the one or more fuse object regions.

Example 19 includes the semiconductor apparatus of any one of Examples 15 to 18, wherein the logic coupled to the one or more substrates is to send the dynamic layer to the first vehicle and the second vehicle.

Example 20 includes at least one computer readable storage medium comprising a set of instructions, which when executed by a computing system, cause the computing system to receive a first message from a first vehicle, wherein the first message includes a first octree representation, from a first vantage point, of one or more differences between a crowdsourced map of an environment and a first real-time volumetric map of the environment, receive a second message from a second vehicle, wherein the second message includes a second octree representation of the one or more differences from a second vantage point, and integrate the first octree representation and the second octree representation into a dynamic layer associated with the crowdsourced map.

Example 21 includes the at least one computer readable storage medium of Example 20, wherein the instructions, when executed, cause the computing system to identify a first set of voxels corresponding to the first octree representation, identify a second set of voxels corresponding to the second octree representation, and generate a Gaussian density distribution based on the first set of voxels and the second set of voxels.

Example 22 includes the at least one computer readable storage medium of Example 21, wherein the instructions, when executed, cause the computing system to identify one or more fuse object regions based on the Gaussian density distribution.

Example 23 includes the at least one computer readable storage medium of Example 22, wherein the instructions, when executed, cause the computing system to add one or more safety margin regions around the one or more fuse object regions.

Example 24 includes the at least one computer readable storage medium of any one of Examples 20 to 23, wherein the instructions, when executed, cause the computing system to send the dynamic layer to the first vehicle and the second vehicle.

Example 25 includes a method of operating a vehicle, including detecting one or more differences between a crowdsourced map of an ambient environment and a real-time volumetric map of the ambient environment, sending a first message via a vehicle-to-vehicle link, wherein the one or more differences are represented in the first message at a first resolution, and sending a second message via a vehicle-to-infrastructure link, wherein the one or more differences are represented in the second message at a second resolution, and wherein the first resolution is less than the second resolution.

Example 26 includes a method of operating a computing system, comprising receiving a first message from a first vehicle, wherein the first message includes a first octree representation, from a first vantage point, of one or more differences between a crowdsourced map of an environment and a first real-time volumetric map of the environment, receiving a second message from a second vehicle, wherein the second message includes a second octree representation of the one or more differences from a second vantage point, and integrating the first octree representation and the second octree representation into a dynamic layer associated with the crowdsourced map.

Example 27 includes means for performing the method of any one of Examples 25 to 26.

Thus, technology described herein may minimize communication between vehicles and a server when a dynamic change in the form of a spatial variation on the environment is detected and reflected in the HD map. The technology also provides a compact representation and consensus of the dynamic HD map information layer coming from multiple sources, and optimizes crowdsourced map updates. Moreover, observations are combined from two different vantage points by registering the two observations in a space-time kinematic frame. In addition, a consistent, compact and extensible representation of the 3D space is provided. The problem of validating multiple observations is addressed by a solution that also considers combining volumetric mapping of the 3D space from different observers to enable faster calculation of dynamic differences compared to the current map.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus comprising:
   one or more substrates; and
   logic coupled to the one or more substrates, wherein the logic is implemented at least partly in configurable logic or fixed-functionality hardware logic, the logic coupled to the one or more substrates to:
   detect one or more differences between a crowdsourced map of an ambient environment and a real-time volumetric map of the ambient environment;
   send a first message via a vehicle-to-vehicle link, wherein the one or more differences are represented in the first message at a first resolution; and
   send a second message via a vehicle-to-infrastructure link, wherein the one or more differences are represented in the second message at a second resolution, and wherein the first resolution is less than the second resolution.

2. The semiconductor apparatus of claim 1, wherein the one or more differences are represented in the first message and the second message as an octree.

3. The semiconductor apparatus of claim 1, wherein the second message further includes appearance sensor data.

4. The semiconductor apparatus of claim 1, wherein the logic coupled to the one or more substrates is to classify the one or more differences as one or more objects based on size and temporal existence.

5. The semiconductor apparatus of claim 4, wherein the first message and the second message are dedicated to objects exceeding a size threshold and a temporal existence threshold.

6. The semiconductor apparatus of claim 1, wherein the logic coupled to the one or more substrates is to:
   initiate a timer in response to detection of the one or more differences;
   cancel the timer if a redundant volumetric representation is received via the vehicle-to-vehicle link prior to expiration of the timer, wherein the first message is sent in response to an expiration of the timer if the redundant volumetric representation is not received via the vehicle-to-vehicle link prior to expiration of the timer; and
   generate a consensus decision with regard to the one or more differences.

7. The semiconductor apparatus of claim 6, wherein the timer is initiated to a value that is inversely proportional to a confidence score associated with the detection of the one or more differences.

8. At least one non-transitory computer readable storage medium comprising a set of instructions, which when executed by a vehicle, cause the vehicle to:
   detect one or more differences between a crowdsourced map of an ambient environment and a real-time volumetric map of the ambient environment;
   send a first message via a vehicle-to-vehicle link, wherein the one or more differences are represented in the first message at a first resolution; and
   send a second message via a vehicle-to-infrastructure link, wherein the one or more differences are represented in the second message at a second resolution, and wherein the first resolution is less than the second resolution.

9. The at least one non-transitory computer readable storage medium of claim 8, wherein the one or more differences are represented in the first message and the second message as an octree.

10. The at least one non-transitory computer readable storage medium of claim 8, wherein the second message further includes appearance sensor data.

11. The at least one non-transitory computer readable storage medium of claim 8, wherein the instructions, when executed, cause the vehicle to classify the one or more differences as one or more objects based on size and temporal existence.

12. The at least one non-transitory computer readable storage medium of claim 11, wherein the first message and the second message are dedicated to objects exceeding a size threshold and a temporal existence threshold.

13. The at least one non-transitory computer readable storage medium of claim 8, wherein the instructions, when executed, cause the vehicle to:
   initiate a timer in response to detection of the one or more differences;
   cancel the timer if a redundant volumetric representation is received via the vehicle-to-vehicle link prior to expiration of the timer, wherein the first message is sent in response to an expiration of the timer if the redundant volumetric representation is not received via the vehicle-to-vehicle link prior to expiration of the timer; and
   generate a consensus decision with regard to the one or more differences.

14. The at least one non-transitory computer readable storage medium of claim 13, wherein the timer is initiated to a value that is inversely proportional to a confidence score associated with the detection of the one or more differences.

15. A semiconductor apparatus comprising:
   one or more substrates; and
   logic coupled to the one or more substrates, wherein the logic is implemented at least partly in configurable logic or fixed-functionality hardware logic, the logic coupled to the one or more substrates to:
   receive a first message from a first vehicle, wherein the first message includes a first octree representation, from a first vantage point, of one or more differences between a crowdsourced map of an environment and a first real-time volumetric map of the environment;
   receive a second message from a second vehicle, wherein the second message includes a second octree representation of the one or more differences from a second vantage point; and
   integrate the first octree representation and the second octree representation into a dynamic layer associated with the crowdsourced map.

16. The semiconductor apparatus of claim 15, wherein the logic coupled to the one or more substrates is to:
   identify a first set of voxels corresponding to the first octree representation;
   identify a second set of voxels corresponding to the second octree representation; and generate a Gaussian density distribution based on the first set of voxels and the second set of voxels.

17. The semiconductor apparatus of claim 16, wherein the logic coupled to the one or more substrates is to identify one or more fuse object regions based on the Gaussian density distribution.

18. The semiconductor apparatus of claim 17, wherein the logic coupled to the one or more substrates is to add one or more safety margin regions around the one or more fuse object regions.

19. The semiconductor apparatus of claim 15, wherein the logic coupled to the one or more substrates is to send the dynamic layer to the first vehicle and the second vehicle.

20. At least one non-transitory computer readable storage medium comprising a set of instructions, which when executed by a computing system, cause the computing system to:

receive a first message from a first vehicle, wherein the first message includes a first octree representation, from a first vantage point, of one or more differences between a crowdsourced map of an environment and a first real-time volumetric map of the environment;

receive a second message from a second vehicle, wherein the second message includes a second octree representation of the one or more differences from a second vantage point; and integrate the first octree representation and the second octree representation into a dynamic layer associated with the crowdsourced map.

21. The at least one non-transitory computer readable storage medium of claim 20, wherein the instructions, when executed, cause the computing system to:

identify a first set of voxels corresponding to the first octree representation;

identify a second set of voxels corresponding to the second octree representation; and generate a Gaussian density distribution based on the first set of voxels and the second set of voxels.

22. The at least one non-transitory computer readable storage medium of claim 21, wherein the instructions, when executed, cause the computing system to identify one or more fuse object regions based on the Gaussian density distribution.

23. The at least one non-transitory computer readable storage medium of claim 22, wherein the instructions, when executed, cause the computing system to add one or more safety margin regions around the one or more fuse object regions.

24. The at least one non-transitory computer readable storage medium of claim 20, wherein the instructions, when executed, cause the computing system to send the dynamic layer to the first vehicle and the second vehicle.

* * * * *